H. RHEAD.
DIRECTION SIGNAL.
APPLICATION FILED JAN. 22, 1921.

1,382,238.

Patented June 21, 1921.
2 SHEETS—SHEET 1.

HARRY RHEAD. _INVENTOR._

BY Watson E. Coleman _ATTORNEY._

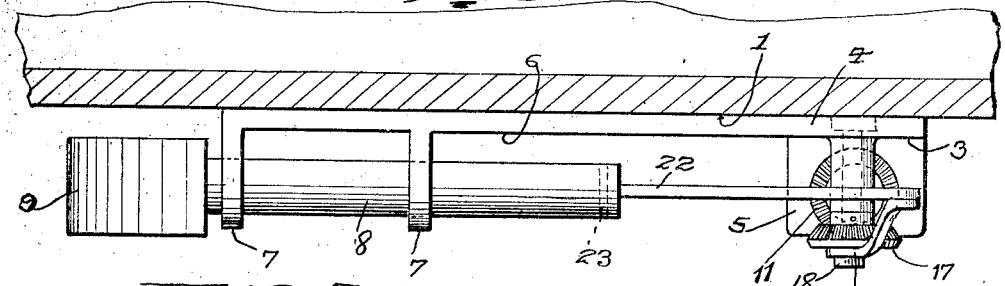
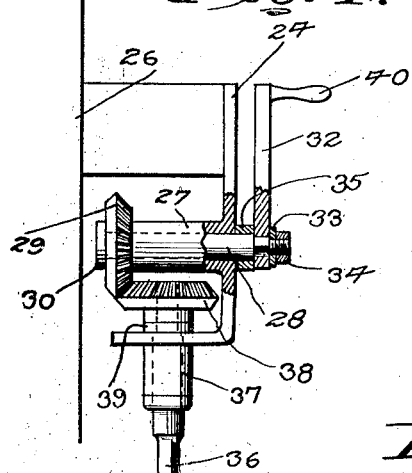
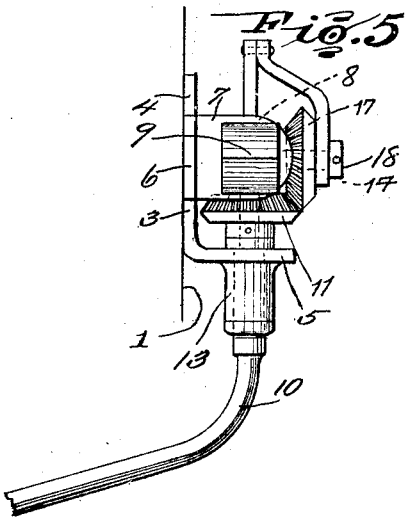
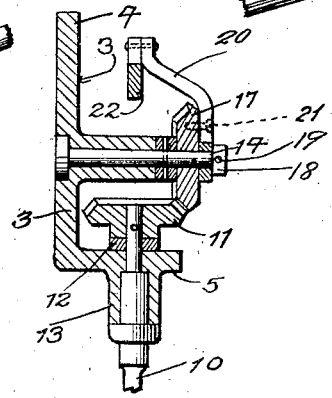

UNITED STATES PATENT OFFICE.

HARRY RHEAD, OF TRENTON, NEW JERSEY.

DIRECTION-SIGNAL.

1,382,238. Specification of Letters Patent. Patented June 21, 1921.

Application filed January 22, 1921. Serial No. 439,202.

*To all whom it may concern:*

Be it known that I, HARRY RHEAD, a citizen of the United States, residing at Trenton, in the county of Mercer and State of New Jersey, have invented certain new and useful Improvements in Direction-Signals, of which the following is a specification, reference being had to the accompanying drawings.

The purpose of the present invention is to provide signals, or indicators for the rear of an automobile, with means carried by the instrument board operatively connected with the indicators or signals, in order to signal to a following automobile, the intention of the chauffeur of the automobile in front to turn to the right or left.

Another purpose embodies the provision of a reciprocating arrow, which may or may not be illuminated, and mounted in guides, so as to project beyond the side of the body when operated, in order to indicate whether or not the automobile is to turn to the right or left.

A still further purpose consists in providing a one-piece bracket, which carries bearings for operative parts or members for the signaling arrows or indicators and also include guides, in which the arrows are operatively mounted, said operative parts being operatively connected by means of shafting with manually operative means on the instrument board, so that the arrows or indicators may project beyond the side of the body of the car, to indicate the direction of turn.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Fig. 3 is a plan view of Fig. 2 showing the rear edge of the automobile in section.

Fig. 4 is a side view of the actuator for the signal, showing parts of the bracket and the crank in section.

Fig. 5 is a view in side elevation of the signal.

Fig. 6 is a sectional view on line 6—6 of Fig. 2.

Figure 1:
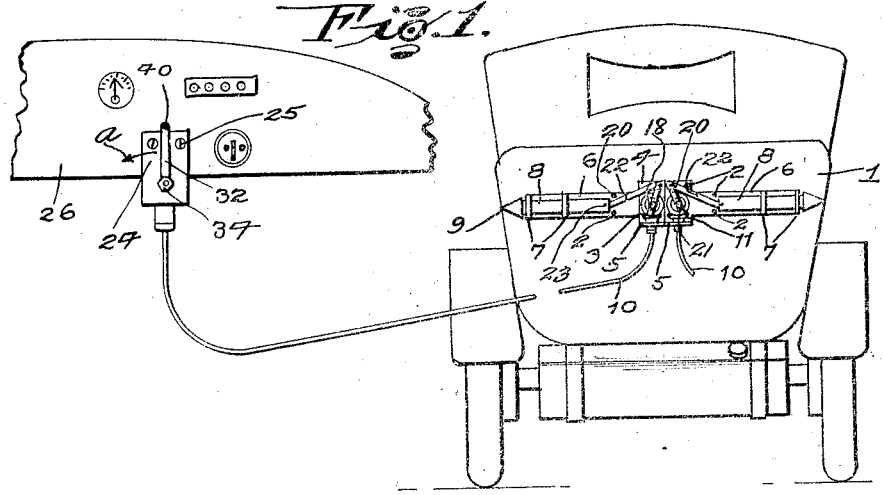
Figure 1 is a view showing a rear view of an automobile with the signal applied, and showing a fragmentary portion of the instrument board with the actuator applied.
Figure 2:
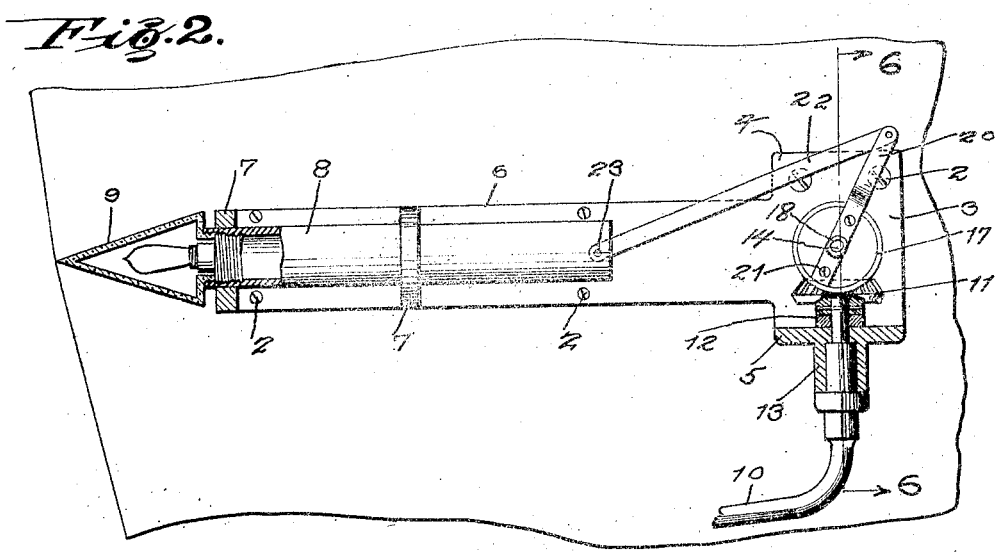
Fig. 2 is an enlarged rear elevation of a signal as applied to a portion of the rear of an automobile, and showing the indicating arrow in section, and a part of the bracket in section.

Referring to the drawings, 1 designates the back of a conventional form of automobile, and secured thereto by means of screws or the like 2 are bracket plates 3. Each bracket plate comprises a vertical part 4 and a rearwardly extending portion 5. Projecting laterally from the vertical part 4 of each bracket plate is a lateral arm 6, which has rearwardly extending guide ears 7.

Mounted to reciprocate in bearings of the guide ears 7 is a tubular indicator or signal arrow 8, provided with a tapered arrow head 9, which is constructed of any suitable material, preferably red glass, so that by means of an electric bulb (not shown) carried in the head, the arrow head may be illuminated for use at night. Any suitable wiring (not shown) may be employed in carrying an electric current to the electric light bulb.

Mounted in the rearwardly extending portion 5 of the bracket is one end of a flexible shaft 10, which carries a beveled gear 11. A suitable collar 12 is interposed between the gear and the rearwardly extending portion 5 of the bracket. This rearwardly extending portion of the bracket has a downwardly extending tubular extension 13, which constitutes a bearing for the flexible shaft. The flexible shaft may be any suitable or conventional construction, as may be found on the market, though it is designed to have a casing, in which the parts of the flexible shaft proper are operated.

The upstanding or vertical part 4 of the bracket has a stud shaft 14, on which a bevel gear 17 is rotatably mounted, which is intermeshed with the gear 11. This bevel gear 17 is held upon the shaft 14 by means of a collar 18 and pin 19. An arm 20 is bolted, riveted or otherwise secured at 21 to the rear face of the bevel gear 17, and pivotally connected to the arm 20 is a link 22, which in turn is pivotally connected at 23 to the tubular indicator or signal.

An angle bracket 24 is secured in any suitable manner as at 25 to the instrument board 26. The upstanding or vertical portion of the bracket 24 has on one face a tubular extension 27, in which a shaft 28 is mounted. One end of the shaft 28 carries a bevel gear 29, the same being secured thereon by the collar 30. A crank arm 32 is fastened upon the shaft 28 by the washer and nut 33 and 34, there being a collar or washer 35 between the crank arm 32 and one face of the bracket 24.

One end 36 of the flexible shaft is mounted in a tubular bearing 37, which projects downwardly from the horizontal portion of the bracket 24, and secured to or carried by the end 36 of this flexible shaft is a bevel gear 38, which meshes with the bevel gear 29, there being a washer 39 interposed between the horizontal portion of the bracket 24 and the bevel gear 38.

In the use and the operation of this signal or direction indicator, it is the aim to employ two devices, mounted on the rear surface of the back of the automobile and it is to be noted that both of them are similarly constructed, hence the description of the operation of one applies to the other.

The crank arm 32 has a handle 40, therefore when the crank arm is moved from its normal vertical position in a direction indicated by the arrow $a$, the tubular indicator or arrow may be reciprocated through the flexible connections, in order to project to one side of the side of the automobile at the rear, thereby notifying those in the rear of the automobile, that it is the intention of the chauffeur of the forward automobile to turn to the left. When the chauffeur decides to turn to the right, the other crank (not shown) is operated, which will move the indicator or signal adjacent the right of the automobile, to project laterally beyond the side of the automobile, so as to indicate to those in the rear that it is the intention to turn to the left.

When the two signals or arrows are in normal horizontal positions, with their heads unexposed beyond the sides of the automobile, it is to be understood that the chauffeur of the forward machine intends to continue forwardly.

The invention having been set forth, what is claimed as being useful is:

1. In a direction indicator, a bracket carried by the rear face of the body of an automobile, a direction indicator mounted to reciprocate in guides of said bracket and having an arrow head, operative rockable gear means mounted on said bracket and having an operative link connection with the indicator to move the indicator and extend its arrow head beyond the plane of the body of the automobile, and oscillatory means movable in a direction correspondingly with the movement of the indicator and carried by the instrument board and having a flexible rotative shaft connection with the operative rockable gear means to impart motion thereto.

2. In a direction indicator, a support carried by the rear face of the body of an automobile, a direction indicator mounted to reciprocate in guides of said support and having an arrow head, operative rotative gear means mounted on the support and having a link connection with the indicator, and rotative gear means carried by the instrument board of an automobile including a flexible shaft connection with the gear means on the support for operating the same, whereby the indicator may reciprocate for projecting the arrow head beyond the side face of the body of the automobile, and oscillatory means movable correspondingly with the movement of the indicator and manually operating the rotative gear means on the instrument board.

3. In a direction indicator, an arrow supported on the rear of the body of an automobile for reciprocating movement to project the head of the arrow beyond the sides of the body, a pair of intermeshing rockable gears supported on the rear of the body, one having an arm rockable therewith and having a link connection with the arrow, rockable intermeshing bevel gears supported on the instrument board of the automobile, one having a rotative flexible shaft connection with the other of the first mentioned intermeshing bevel gears, and a handle carried by the other of said second mentioned bevel gears, whereby upon a rockable movement correspondingly with the direction movement of the arrow, the rockable movement of the handle imparts a rotating movement to the flexible shaft, which in turn imparts a rotative movement to the first bevel gears, which, through their link connections, imparts a reciprocating direction indicating movement to the arrow.

In testimony whereof I hereunto affix my signature.

HARRY RHEAD.